(12) United States Patent
Ooka

(10) Patent No.: US 6,935,482 B2
(45) Date of Patent: Aug. 30, 2005

(54) CLUTCH GEAR HAVING BOSS PART WITH SPLINE AND METHOD FOR MANUFACTURING THE SAME

(75) Inventor: Junichi Ooka, Nagoya (JP)

(73) Assignee: O-Oka Corporation, Nagoya (JP)

( * ) Notice: Subject to any disclaimer, the term of this patent is extended or adjusted under 35 U.S.C. 154(b) by 0 days.

(21) Appl. No.: 10/618,643

(22) Filed: Jul. 15, 2003

(65) Prior Publication Data

US 2004/0079610 A1 Apr. 29, 2004

(30) Foreign Application Priority Data

Jul. 15, 2002 (JP) ............................... 2002-206082

(51) Int. Cl.$^7$ ............................................. F16D 23/00
(52) U.S. Cl. ........................ 192/108; 74/460; 29/893.34
(58) Field of Search ........................ 192/108; 29/893.33, 29/893.34, 893.35; 74/434, 460

(56) References Cited

U.S. PATENT DOCUMENTS 4,938,089 A * 7/1990 Ohoka ........................ 192/108
5,363,714 A * 11/1994 Hoguchi ..................... 192/108
6,276,180 B1   8/2001 Hirschvogel et al.
6,432,017 B1 * 8/2002 Shimomura ................. 475/160

FOREIGN PATENT DOCUMENTS

| EP | 0 581 483 | | 2/1994 |
| EP | 0 949 435 | | 10/1999 |
| JP | 11-300447 A | * | 11/1999 |

* cited by examiner

Primary Examiner—Rodney H. Bonck
(74) Attorney, Agent, or Firm—Oblon, Spivak, McClelland, Maier & Neustadt, P.C.

(57) ABSTRACT

A clutch gear having a boss part with a spline which is formed on an outer peripheral surface of the boss part formed on an axial end surface of the clutch gear having jaw clutch teeth formed on an outer peripheral surface thereof, in which the boss part, with the spline formed on outer peripheral surface thereof, is formed integrally and coaxially with the clutch gear having the jaw clutch teeth formed on the outer peripheral surface thereof by forging, the diameter of the boss part is shorter than that of the clutch gear, and an end part of an effective portion of the spline comes to at least an end surface of the clutch gear.

5 Claims, 4 Drawing Sheets

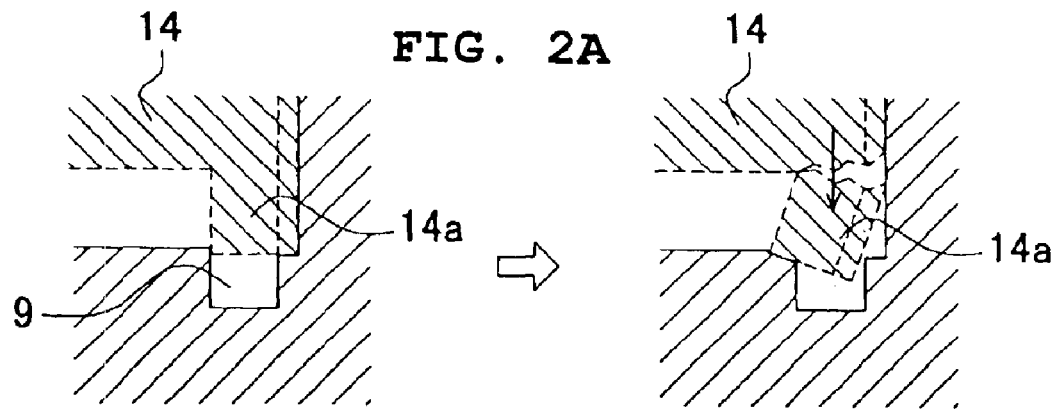
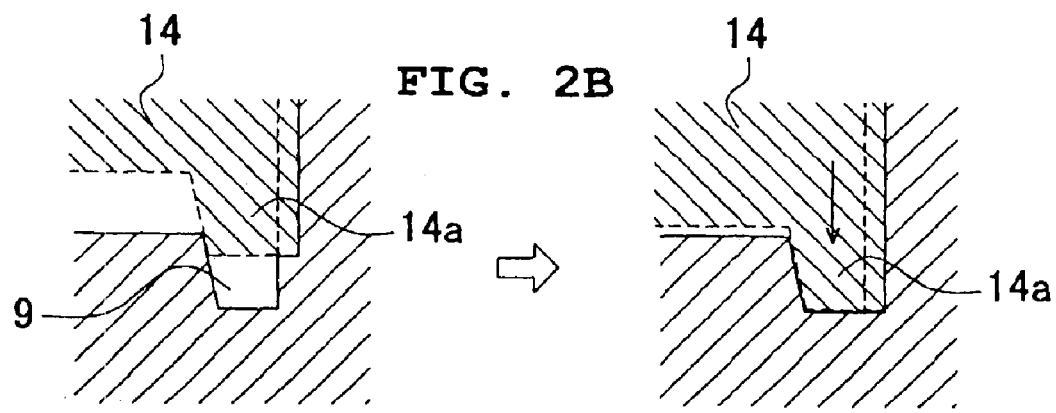
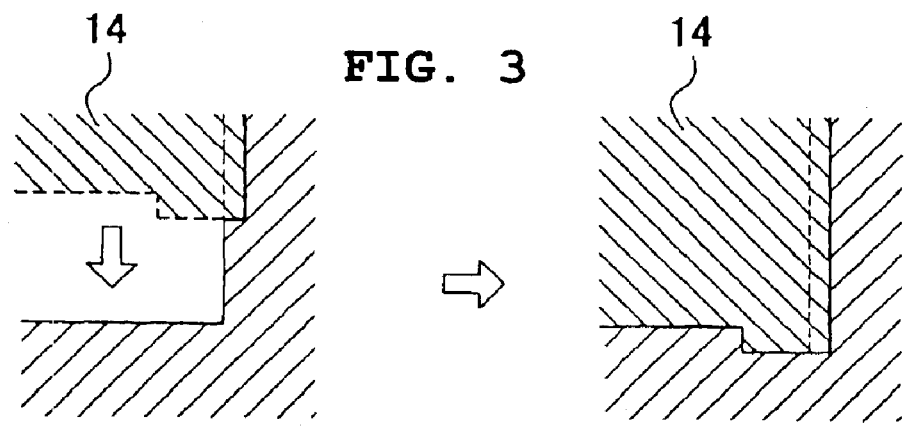

FIG. 5A (PRIOR ART)
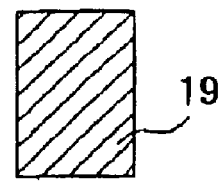
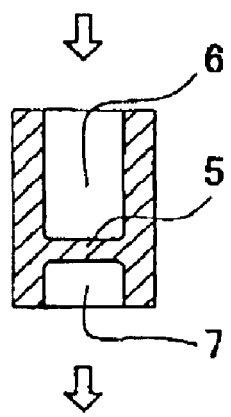
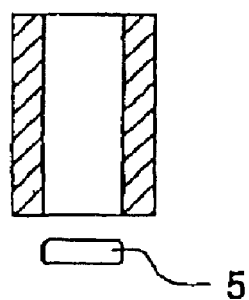
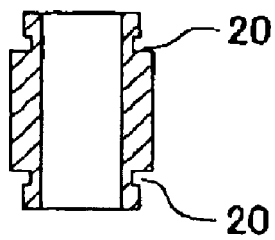
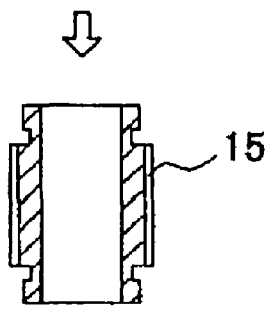
FIG. 5B (PRIOR ART)
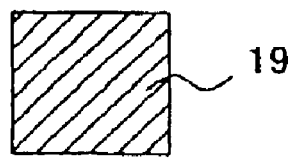
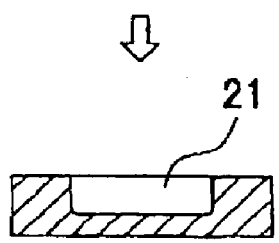
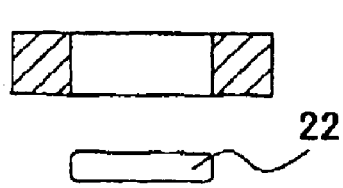
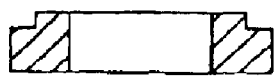
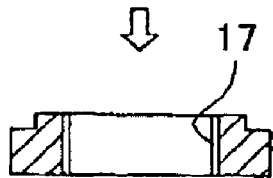
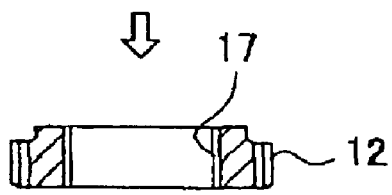

CLUTCH GEAR HAVING BOSS PART WITH SPLINE AND METHOD FOR MANUFACTURING THE SAME

BACKGROUND OF THE INVENTION

1. Field of the Invention

The present invention relates to a clutch gear having a boss part with a spline which is formed on an outer peripheral surface of the boss part, formed on an axial end surface of the clutch gear, having jaw clutch teeth formed on an outer peripheral surface thereof.

2. Description of the Prior Art

In a clutch gear having a boss part with a spline has a problem wherein it is known impossible to maintain an effective portion of the spline reaching to the level of an end surface of the clutch gear by either cutting or forging a work, a boss part of which is integrally formed with an outer peripheral surface of the clutch gear.

Accordingly, as shown in FIG. 4, an inner cylinder member 16 having an outer spline 15 formed on an outer peripheral surface thereof and an external cylinder member 18 having an inner spline 17 formed on an inner peripheral surface thereof are respectively formed and the two members are combined by spline engagement each other. A jaw clutch tooth 12 is formed on an outer peripheral surface of the external cylinder member 18.

Therefore the external cylinder member 18 operates as a clutch gear. On the other hand, a portion formed spline of an inner cylinder member 16 exposed from the external cylinder member 18 operates as a boss part for fitting.

Moreover an effective portion of the spline 15 formed on the outer peripheral surface of the boss part come to the level of an end surface of the clutch gear.

The cylinder inner and external members are formed by punching a cylinder material 19 which is formed by cutting a round bar material, from both end side thereof, forming a deep holes 6,7 which are separated by a wall 5, bleaching and dropping the wall 5 by pierce process, cutting both end parts of an outer peripheral surface of the cylinder material 19 in order to form grooves 20,20 and finally forming an external spline 15 by cutting (as shown in FIG. 5A)

On the other hand, the external cylinder is formed by depressing a cylinder material 19 which is formed by cutting a round material, into flat, forming a concave 21 with a bottom, bleaching and dropping a bottom part 22 by pierce process, cutting angle parts of an end surface of the cylinder material 19, forming an internal spline 17 by cutting and forming a jaw clutch tooth 12 by cutting process.

Although there are many processing methods for each member, except for the above described processing methods, they need many steps of process and are inefficient because of forming two members and uniting them.

SUMMARY OF THE INVENTION

It is an object of the present invention to gain an efficiency by integral molding with an effective utilization of welding process.

It is another object of the present invention to provide a clutch gear having a boss part with a spline which is formed on an outer peripheral surface of the boss part formed on an axial end surface of the clutch gear having jaw clutch teeth formed on an outer peripheral surface thereof, in which the boss part, with the spline formed on outer peripheral surface thereof, is formed integrally and coaxially with the clutch gear having the jaw clutch teeth formed on the outer peripheral surface thereof by forging, the diameter of the boss part is shorter than that of the clutch gear, and an end part of an effective portion of the spline comes to at least an end surface of the clutch gear.

It is a further object of the present invention to provide a clutch gear having the boss part with the spline, in which the end part of the effective portion of the spline is adjacent to the end surface of the clutch gear.

It is a further object of the present invention to provide a clutch gear having the boss part with the spline, in which a ring-like groove is formed on the end surface of the clutch gear, a diameter of an inner wall of the ring-like groove is nearly equal with that of the boss part, and a part of the effective portion of the spline inserts into the ring-like groove.

It is a still further object of the present invention to provide a clutch gear having the boss part with the spline, in which an inclined surface is formed on an outer wall of the ring-like groove in order to gradually decrease the width of the ring-like groove as coming to a bottom of the ring-like groove.

It is a further object of the present invention to provide a method for manufacturing a clutch gear having a boss part with a spline which is formed on the outer peripheral surface of the boss part formed on the axial end surface of the clutch gear having jaw clutch teeth formed on the outer peripheral surface thereof, in which a work as the clutch gear has the boss part to be smaller than the clutch gear integrally and coaxially formed with the clutch gear, and an ring like groove having an inner peripheral wall, an diameter of the ring-like groove being equal to that of the outer peripheral wall of the boss part on axial end surface thereof, in which a spline is formed from the outer peripheral surface of the boss part to the inner peripheral surface of the ring like groove by pressing relatively the work to a die having a tooth form for forming the spline at a portion corresponding to the outer peripheral surface of the boss part.

It is a further object of the present invention to provide a method for manufacturing a clutch gear having a boss part with a spline, in which the inclined surface is formed on the outer wall of the ring-like groove in order to gradually decrease the width of the ring-like groove as coming to the bottom of the ring-like groove.

According to the present invention a clutch gear having a boss part with a spline in which the clutch gear is a one body i.e. solid part and an effective part of the spline comes to the end surface of the clutch gear, has far less steps of process than conventional products, a reliability of strength of products is high because of having no bonding parts. The length of the boss part is reduced by forming the ring-like groove and the compact in gear is attained.

An inclined surface is formed on an outer peripheral wall of the ring-like groove in order to reduce the width of the ring-like groove as coming to the bottom of ring-like groove.

Therefore, when a spline continues deeply into the ring-like groove, it is possible to prevent a metal mold from breaking, to form a spline at lower portion from the axial end surface of the gear and to produce ideal products.

BRIEF DESCRIPTION OF THE DRAWINGS

FIGS. 2A and 2B are illustrative views illustrating an advantage of forming a taper on inner peripheral surface of a ring-like groove in case that a spline is formed by forging process;

FIG. 3 is an illustrative view illustrating modifications wherein an end part of the spline is positioned at lower part from edge part on a side surface of a flange-discform part by pressing force of punch;

FIGS. 5A and 5B are illustrative views showing each step on a conventional manufacturing process of each members.

DETAILED DESCRIPTION OF THE PREFERRED EMBODIMENTS

A clutch gear having a boss part with a spine and a method for manufacturing a clutch gear according to the embodiment of the present invention are described with reference to the accompanying drawings.

Figure 1A:
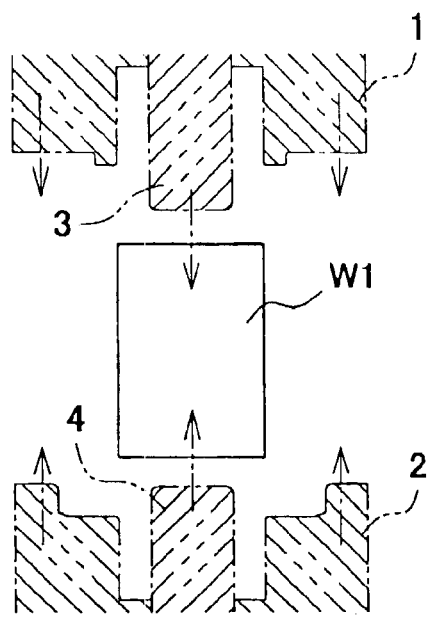
FIGS. 1A, 1B, 1C, 1D, 1E and 1F are illustrative views illustrating a manufacturing process of a clutch gear having a boss part with a spline according to the embodiment of the present invention.

FIG. 1 is an illustrative view illustrating a manufacturing process, wherein a cylinder member W1 (as shown in FIG. 1A) which is formed by cutting a round bar, is depressed from both axial end surfaces by a punch 3 of a cope 1 and a punch 4 of a drag 2 in order to form deep concaves 6, 7 which are separated by a wall 5 for closing opposed inner peripheral surfaces at a mid portion thereof and a flange-discform part 8 is outwardly projected in a radial direction thereof on outer peripheral surface thereof.

Figure 1B:
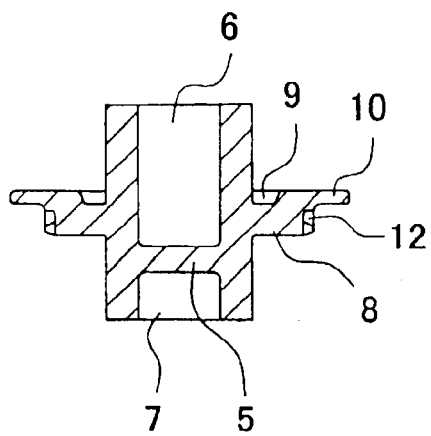

A ring-like groove 9 is formed on the flange-discform part 8, in which the diameter of an inner wall of the ring-like groove 9 is nearly equal to that of the boss part, and a jaw clutch teeth 12 i.e. dog clutch teeth is formed on an outer peripheral surface of the flange-discform part 8. Therefore weld flashes 10 occur along the outer peripheral surface of the flange-discform part 8 as shown in FIG. 1B.

Figure 1C:
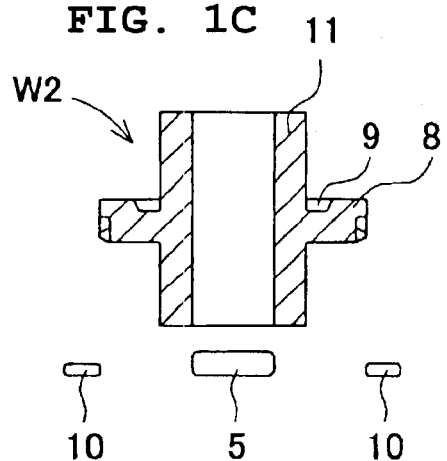
Figure 1D:
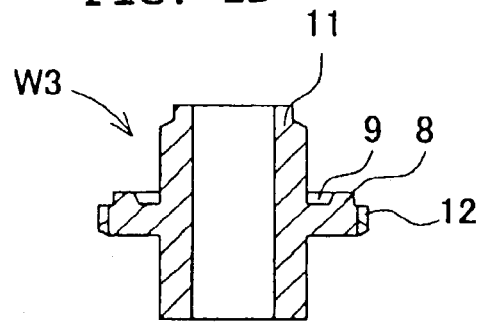
Figure 1E:
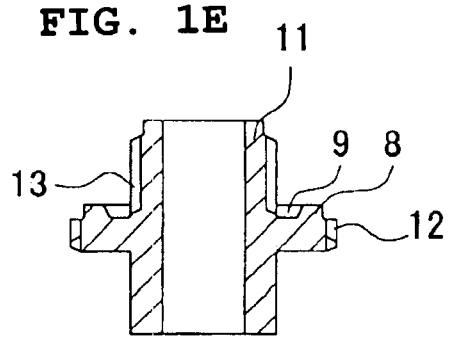
Figure 1F:
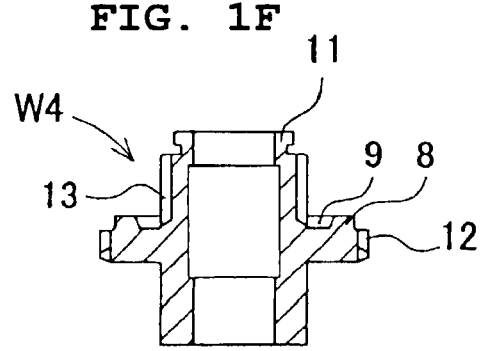
Figure 4:
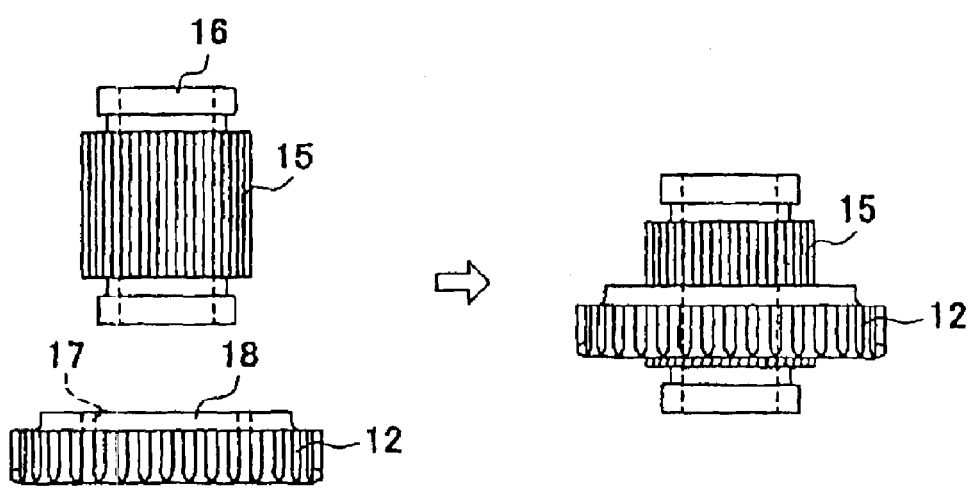
FIG. 4 is an illustrative view illustrating a conventional method for combining members in order to manufacture a clutch gear having a boss part with a spline.

In the next process, the wall 5 is depressed by pierce process so that a cylinder body 11 having an axial hole therein is formed, weld flashes 10 are cut and an article W2 having the flange-discform part 8 with the ring-like groove 9 on an outer peripheral surface of the cylinder 11 is formed as shown in FIG. 1C.

Moreover, end parts of the cylinder body 11 of the article W2 are cut in order to produce a work W3 form used on next process. In the next process, a spline 13 continued the inner wall of the ring-like groove 9 is formed on the outer peripheral surface of the cylinder 11 (the boss part) formed the ring-like groove 9 of the work W3.

This spline 13 is able to be formed by pressing relatively the work W3 to the die having a tooth forms for forming a spline at a portion corresponding to the boss part 11 by forging process. Pressing relatively the work W3 to the die includes pressing the work W3 into the die and pressing the die (the punch) to work W3.

Finally, an end peripheral surface and an inner peripheral part of the cylinder body are processed in order to finish products W4.

The resultant clutch gear having the boss part with the spline in which the boss part, with the spline formed on the outer peripheral surface thereof, which is formed integrally and coaxially with the clutch gear having the jaw clutch teeth formed on the outer peripheral surface thereof by forging, the diameter of the boss part is shorter than that of the clutch gear, and the spline continues the inner wall of the ring-like groove. The low end of spline is formed at the inner wall of the ring-like groove.

Therefore, the clutch gear is a one body i.e. solid part and the effective part of the spline comes to the end surface of the clutch gear at the same time.

Comparing the above one body with combined two members respectively formed, it may reduce the number of step in process to half of them and may realized by forming the ring like groove.

It is possible that the spline is formed by cutting. Because the ring-like groove is expanded for an escape of tools. When, in case of forming a spline by forging means, the spline continued the ring-like groove is formed by a die having a tooth for forming a spline at a portion corresponding to the boss part of the work, a tip edge of the die must be a cylindrical shape corresponding to the ring-like groove.

A cylinder part 14a, wherein an outer peripheral surface of a cylinder part 14a is not constrainted, is easy to break by applying high stress, which is occurred by a plastic resistance and expands outwardly, to the die 14 as shown in FIG. 2A.

In the embodiments of the present invention, an inclined surface is formed on an outer peripheral wall of the ring-like groove in order to gradually reduce a width of the ring-like groove.

Therefore, when the cylinder part 14a is pressed into the ring-like groove 9, the cylinder part is pressed into center side by the inclined surface, and the breaking of the cylinder is prevented by balancing a reaction force and a plastic resistance. When an inclined surface is further formed on the outer peripheral surface of the cylinder part, the reaction force becomes higher.

The preferred embodiments of the present invention, as herein disclosed, are taken as some embodiments for explaining the present invention. It is to be understood that the present invention should not be restricted by these embodiments and any modifications and additions are possible so far as they are not beyond the technical idea or principle based on descriptions of the scope of the patent claims.

For example, it has no problem that a boss part is formed on only one side. In the above embodiment it is described that a spline are formed on both sides of a boss part. The inverse tapered shape is formed, and is not formed on a jaw clutch teeth. A design is changed accordingly and a ring-like groove is not previously formed on a boss part side of a flange-discform part beforehand, a ring-like groove is formed at lower part than the end part of a spline into a side surface of a flange-discform part by pressing force of a punch 14. In this instance, a concave pressed by the punch is formed around the spline formed into the side surface of a flange-discform.

What is claimed is:

1. A clutch gear having a boss part with a spline which is formed on an outer peripheral surface of said boss part formed on an axial end surface of said clutch gear having jaw clutch teeth formed on an outer peripheral surface thereof, wherein said boss part, with said spline formed on outer peripheral surface thereof, is formed integrally and coaxially with said clutch gear having said jaw clutch teeth formed on said outer peripheral surface thereof by forging, wherein the diameter of said boss part is shorter than that of said clutch gear, and an end part of an effective portion of said spline comes out of an end surface of a part having said jaw clutch teeth on said clutch gear, and wherein the axial length of said spline is longer than that of said jaw clutch teeth.

2. A clutch gear having said boss part with said spline according to claim 1, wherein a ring-like groove is formed on said end surface of said clutch gear, a diameter of an inner wall of said ring-like groove is nearly equal with that of said boss part, and a part of said effective portion of said spline inserts into said ring-like groove.

3. A clutch gear having said boss part with said spline according to claim 2, wherein an inclined surface is formed on an outer wall of said ring-like groove in order to gradually decrease the width of said ring-like groove as coming to a bottom of said ring-like groove.

4. A clutch gear having said boss part with said spline according to claim 3, wherein one end of said spline is formed at said inner peripheral surface of said ring-like groove.

5. A clutch gear having said boss part with said spline according to claim 1, wherein said clutch gear comprises a hollow cylinder having said jaw clutch teeth formed at a central part thereof in the axial direction and said boss part formed at one end part thereof in the axial direction.

* * * * *